UNITED STATES PATENT OFFICE.

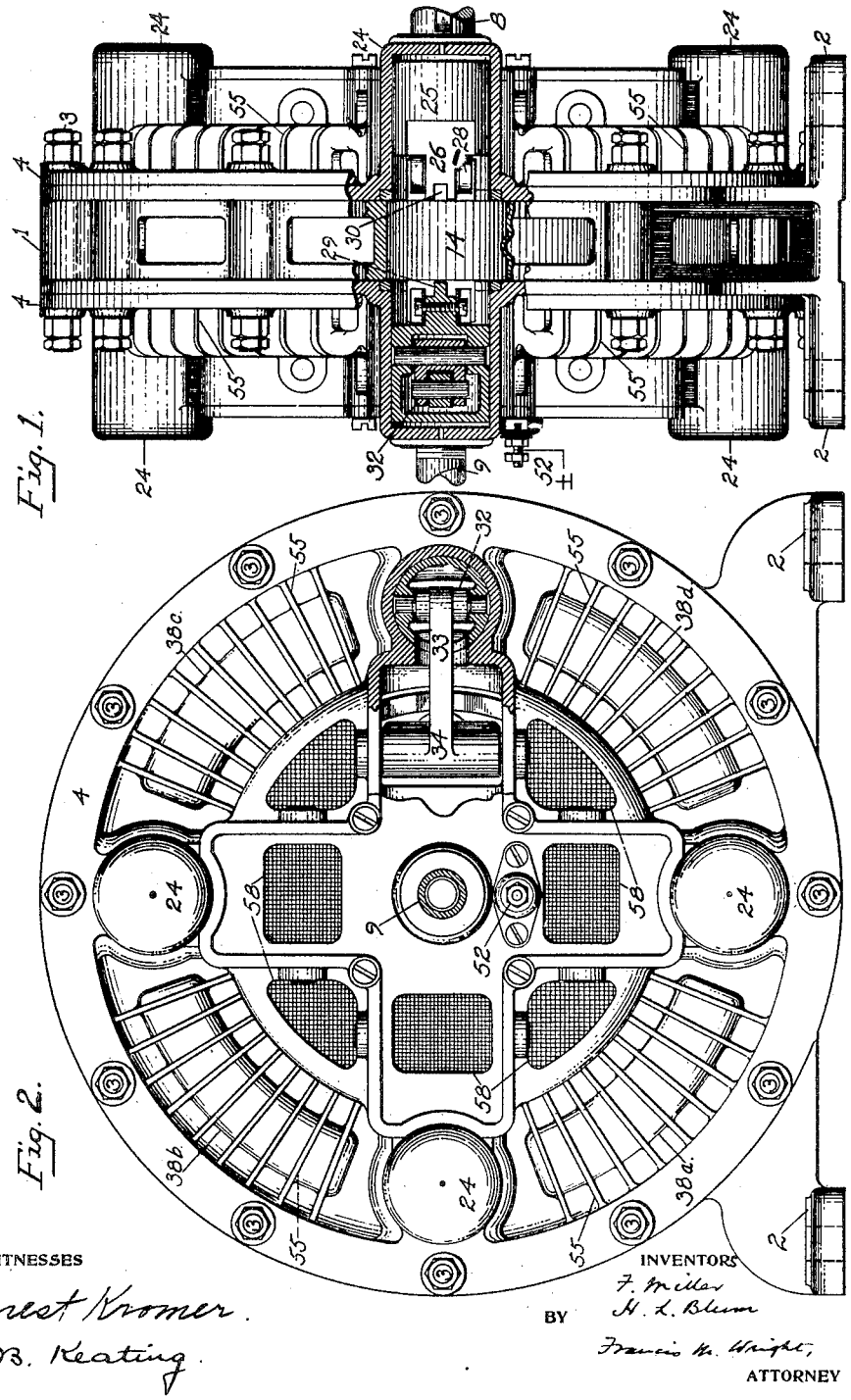

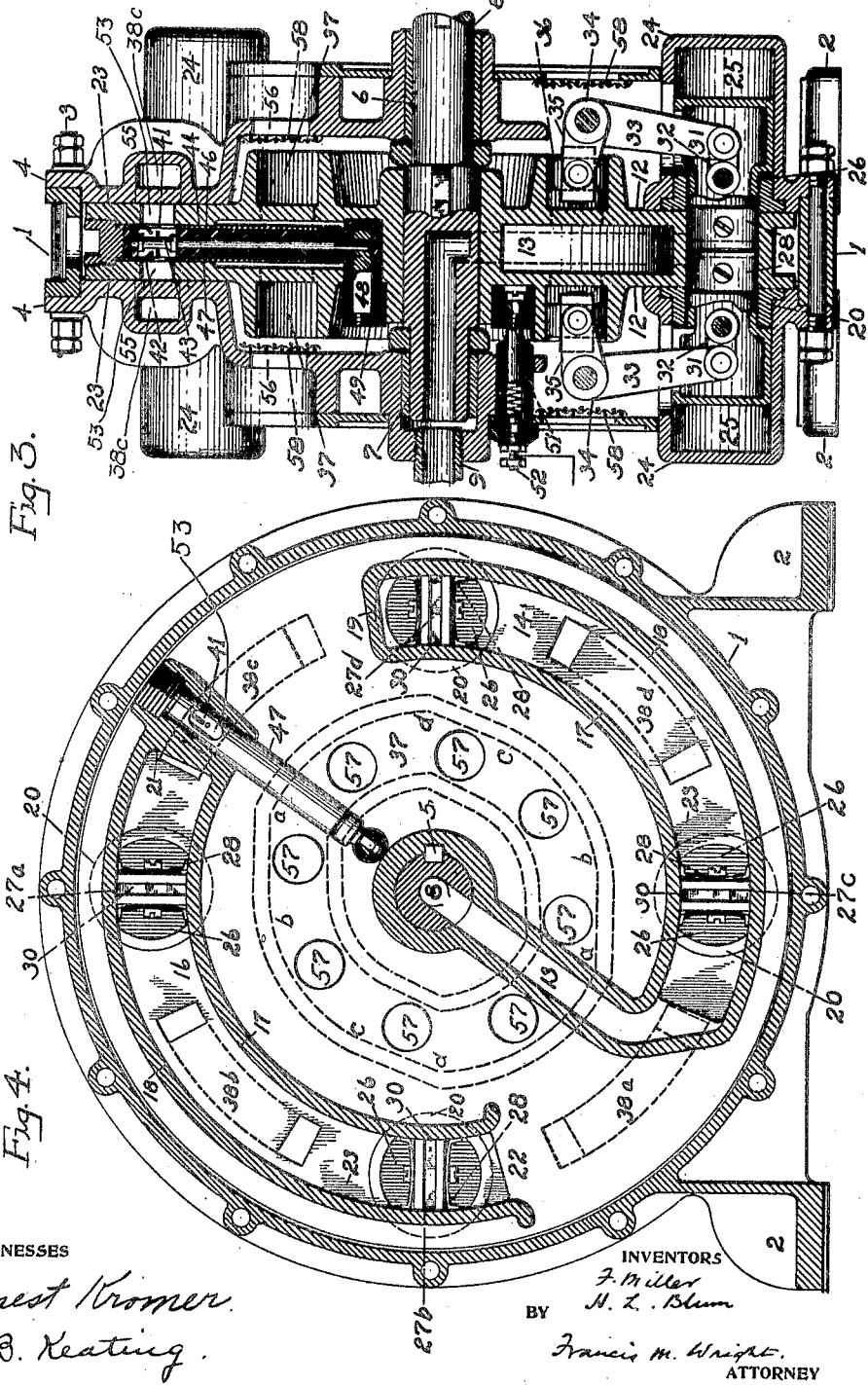

FREDERICK MILLER AND HOSMER L. BLUM, OF SAN FRANCISCO, CALIFORNIA.

ROTARY INTERNAL-COMBUSTION ENGINE.

1,082,205.  Specification of Letters Patent.  Patented Dec. 23, 1913.

Application filed August 17, 1912. Serial No. 715,585.

*To all whom it may concern:*

Be it known that we, FREDERICK MILLER and HOSMER L. BLUM, citizens of the United States, residing at San Francisco, in the county of San Francisco and State of California, have invented new and useful Improvements in Rotary Internal-Combustion Engines, of which the following is a specification.

Our invention relates to improvements in rotary internal combustion engines, and the object of the invention is to provide such a rotary engine, which will be free from vibration; very efficient and powerful for its size and weight; can readily be applied, without intermediate gearing, direct to the shaft to be rotated; the cooling of which will be effected in a very simple manner; and in which the means for igniting the combustible mixture shall be as simple as possible.

In the accompanying drawing, Figure 1 is a side view of the engine; Fig. 2 is an end view thereof; Fig. 3 is a section through the shaft of the engine; Fig. 4 is a section at right angles to said shaft.

Referring to the drawing, 1 indicates a central cylindrical casing, provided with suitable means of support, as feet 2. Secured to said cylinder by bolts 3 are heads 4, formed centrally with bearings 6, 7, for the shaft 8 of the engine. Said shaft is hollow at the end supported in the bearing 7.

9 indicates a pipe for supplying combustible mixture to the engine, an end of which pipe is secured in a head 4 adjacent to the bearing 7, and thereby said combustible mixture is permitted to enter the hollow shaft. Keyed to the shaft 8, as shown at 5, is a rotor 11, having two parallel circular walls 12, and leading from said shaft radially through said rotor is a conduit 13, best shown in Fig. 4 and in dotted lines in Fig. 3. Said rotor is formed with two symmetrically arranged arcuate chambers 14, 16, each open at its sides through the walls 12, and formed by inner walls 17 and outer walls 18, the chamber 14 having a terminal wall 19, and the chamber 16 having a terminal wall 21. The other end of the chamber 14 communicates with the radially extending conduit 13, while the other end of the chamber 16 is open to the atmosphere, as shown at 22. Between said walls 17, 18, the chambers are closed by walls 23 of the heads 4.

Each head is formed with a number (here shown as four) of cylindrical guide chambers 24, in which are guided hollow pistons 25 having reduced cylindrical portions 26 reciprocating in bronze bushings 20 and terminating in gates $27^a$, $27^b$, $27^c$, $27^d$, having secured thereto spring plates 28, the edges of which bear against the inner and outer walls respectively of the rotor, and prevent leakage of gases past said gates. The cylindrical guide chambers 24 are formed with closed outer ends, so that the air contained within said chambers is compressed therein upon the outward movement of the pistons, and thus forms cushions to prevent shock and jar due to the rapid reciprocation of the pistons in said chambers. With the same object, the inner or opposing faces of the two gates, on opposite sides of the engine, of each pair, are formed with radially extending tongues 29, and grooves 30, respectively, so that, when said faces come together, as hereinafter explained, a tight joint is made for preventing the leakage of gas therebetween. To said pistons are pivotally attached, as shown at 31, links 32, connected to arms 33 of levers 34, pivoted on the heads, other arms 35 of which carry rollers 36 which move in cam grooves 37 formed on opposite sides of the rotor. By means of these cam grooves, the gates on opposite sides of the rotor, are, in the rotation of the shaft, closed together, and are then separated from each other to such a distance that the end walls 19, 21 of the chambers 14, 16, can pass between them. Such closure and separation occur twice in each rotation of the rotor. The two halves of the cam grooves are each so formed that when the rollers pass the points $a$ therein, the gates approach each other, when they pass the points $b$, the gates are fully closed, when they pass the points $c$, the gates begin to open, and when they pass the points $d$, the gates are fully open.

$38^a$, $38^b$, $38^c$, $38^d$ indicate conduits formed on the heads, and opening at their ends in the walls of said heads to permit the passage of combustible gas from one point of the head to the other.

41 indicates a contact in the circuit of a magneto, which circuit is completed by two contacts 42 connected with the metal of the engine. The contact 41 is supported at the center of an enlarged portion 43 of a metal rod 44, which is supported by insulating material 46 contained within a metallic casing 47, and is connected to a conductor 48 connected to a collector ring 49 which rotates under a brush 51 having a terminal 52. The parts of the casing 47 and of the walls 12 where the contacts 41 and 42 are located, are formed with opposite slots 53, into which the combustible mixture can flow on opposite sides, being immediately ignited by the spark maintained constantly between the two contacts 41, 42.

The engine is shown in the position in which the slots 53 have just passed the rear opening of the upper right-hand conduit 38$^c$, in which conduit the combustible mixture has therefore just been ignited. The burning gas and products of combustion are flowing from the rear end of said conduit 38$^c$ into the expansion chamber 16, in which chamber they expand between the advancing terminal walls 21 of said chamber, and the gates 27$^a$ said gates having at that time been inserted in and closed within the chamber 16 by the cam grooves 37, and rollers 36. Said gates remain closed in said expansion chamber 16 until the points $c$ of said cam grooves pass said rollers 36, when they are separated, and are completely withdrawn when the points $d$ of said cam grooves pass said rollers. Upon the separation of the gates from one another, the products of combustion escape from the expansion chamber 16 through its rear end 22.

While one charge of combustible mixture is being ignited and expanded in the expansion chamber, another charge is entering the compression chamber 14 by the conduit 13. In said compression chamber the gates 27$^c$, like the gates 27$^a$ have been inserted and have just closed together, the points $b$ of the other half of the cam grooves having passed the rollers 36. The combustible mixture is also able to pass into the left-hand lower conduits 38$^a$, and enters said conduits and the advancing portion of the chamber 14, which advancing portion, in front of the lowermost gates 27$^c$, continually increase in size as the conduit 14 advances. The mixture cannot, however, flow out of, the conduits 38$^a$, except into the chamber 14. When the portions $c$ of the cam grooves reach the rollers, the gates 27$^c$ are withdrawn, and the combustible mixture can flow to the closed end of the compression chamber 14. The combustible mixture is then confined in said compression chamber by the gates 27$^b$ on the left hand side of Fig. 4, and, said gates being non-rotatable, while the closed end of the compression chamber continues to rotate, the rear portion of the compression chamber is continually contracted, and the combustible mixture is compressed, until the rear end of the compression chamber arrives at, and passes, the front ends of the conduits 38$^a$ in the left hand lower portion of the heads, whereupon said combustible mixture is compressed in said conduits 38$^a$, ready to be ignited by the spark when the contacts 41, 42 arrive thereat in the rotation of the rotor. The ignition, expansion, and discharge of the gases have already been described.

It is apparent that the above-described intake, compression, ignition, expansion and discharge of gases will take place four times in each revolution of the rotor, as the conduit 13, cam grooves 37 compression chamber 14, sparking device, and expansion chamber 16 rotate in turn past each pair of gates and each pair of conduits in the head. Said heads surrounding said conduits are formed with heat-radiating ribs 55 for the purpose of air cooling the conduits in which ignition of the gases takes place. Also for the cooling said heads, they are formed with openings 56 for admitting and circulating air, and the rotor is formed with openings 57 for like purpose. The openings 56, are covered with fine screens 58 to prevent the entrance of dust into the interior of the head.

An important feature of our invention is freedom from vibration since there is no movement of any part in a direction either parallel with the shaft, or at right angles thereto, which is not balanced by an equal and opposite movement of another part of the same magnitude.

It is evident that, instead of the casing being stationary, and the shaft, chambers, and cam grooves, rotated within the casing, the arrangement may be reversed, that is, the shaft and the part immediately connected therewith may be stationary and the casing rotate around the same, and that the invention is the same whether used in one manner or in the other. For the sake of clearness and conciseness, we shall, in the claims, define the invention as being of the former type, that is of the type shown in the drawing and described in the specification, but it is to be understood that certain language in the claims must be given such means as to enable them to apply also to the latter type.

We claim:—

1. In combination, a casing having heads, a shaft supported by said heads, a supply conduit, a rotor mounted on said shaft, gate-actuating devices controlled by said rotor said rotor being formed with a compression chamber closed at its rear end, and with which said conduit connects, and with an expansion chamber open at its rear end, said chambers being open at the sides between said heads and said heads having conduits adapted to communicate with said chambers in the rotation of the latter, an ignition device, and gates oppositely moved by said devices into and out of said chambers.

2. In combination, a casing having heads, a shaft supported by said heads, a supply conduit, a rotor mounted on said shaft, and formed with cams, with a radial conduit connecting with the aforesaid conduit, with a compression chamber, closed at its rear end, and with which said latter conduit connects, and with an expansion chamber open at its rear end, said chambers being open at the sides between said heads and said heads having conduits adapted to communicate with said chambers in the rotation of the latter, an ignition device, and gates oppositely moved by said cams into and out of said chambers.

3. In combination, a casing having heads, a hollow shaft supported by said heads, a supply tube communicating with said hollow shaft, a rotor supported on said hollow shaft, and formed with cams, with a conduit leading radially from said hollow shaft, with a compression chamber, closed at its rear end, and with which said conduit connects, and with an expansion chamber open at its rear end, said chambers being open at the sides between said heads and said heads having conduits adapted to communicate with said chambers in the rotation of the latter, an ignition device, and gates oppositely moved by said cams into and out of said chambers.

4. In combination, a casing having heads, a hollow shaft rotatably supported by said heads, a supply tube communicating with said hollow shaft, a rotor rotatable with said hollow shaft, and formed with a conduit leading radially from said hollow shaft, with a compression chamber, closed at its rear end, and with which said conduit connects, and with an expansion chamber open at its rear end, said chambers being open at the sides between said heads, and said heads having conduits adapted to communicate with said chambers in the rotation of the latter, an ignition device, said rotor being also formed with cams, rollers actuated by said cams, and gates oppositely moved by said rollers into and out of said chambers.

5. In combination, a cylindrical casing having heads formed with cylindrical guides, with bearings for levers, and with gas conduits, plungers in said guides, levers operatively connected to said plungers and mounted in said bearings, rollers carried by said levers, a hollow shaft having bearings in said heads, a supply tube connected to one of said bearings and communicating with said hollow shaft, a rotor mounted on said hollow shaft, and formed with a conduit leading radially therefrom, with an arcuate compression chamber closed at its rear end, and with which the other end of the conduit connects, and with an arcuate expansion chamber open at its rear end, said chambers being open at the sides between said heads, said rotor being also formed with cams for actuating said rollers to operate said levers, an ignition device, gates oppositely moved by said plungers into and out of the aforesaid chambers, said conduits being adapted to communicate with said chambers in the rotation of the latter.

In testimony whereof we have hereunto set our hands in the presence of two subscribing witnesses.

FREDERICK MILLER.
HOSMER L. BLUM.

Witnesses:
FRANCIS M. WRIGHT,
D. B. RICHARDS.